United States Patent Office 2,816,827
Patented Dec. 17, 1957

2,816,827

PROCESS FOR THE TREATMENT OF PARTICULATE FOAMABLE STYRENE POLYMER COMPOSITIONS

Murray H. Roth, Springfield, Mass., assignor to Monsanto Chemical Company, St. Louis, Mo., a corporation of Delaware No Drawing. Application September 10, 1956,
Serial No. 608,678

4 Claims. (Cl. 260—2.5)

The present invention relates to a process for the physical treatment of particulate foamable styrene polymer compositions to improve the foaming properties thereof.

Styrene polymer foams constitute a valuable class of materials which are finding increasingly wide application in the fabrication of numerous consumer and industrial articles. Such styrene polymer foams can be prepared by heating small particles of styrene polymers which have volatile organic compounds incorporated therein as foaming agents, such heating preferably being effected by either hot water or steam. The above-described method of preparing styrene polymer foams is known to suffer from two deficiencies. First, the pore sizes of the foams so obtained tend to be irregular and relatively large, e. g., the majority of the cells have a diameter of greater than about 0.05 inch, whereas the most desirable foams have a substantially uniform cell size with the majority of the cells having a diameter of less than about 0.02 inch. Secondly, the particulate styrene polymers which contain relatively large quantities of foaming agent, e. g., 7% or more, frequently do not foam well and yield foams having undesirably high densities.

It is an object of this invention to provide particulate foamable styrene polymer compositions which, when heated, yield foams having substantially uniform pore sizes, the majority of which have a diameter of less than about 0.02 inch.

Another object of this invention is to provide particulate foamable styrene polymer compositions containing relatively large quantities of foaming agents and which, when heated, yield foams of desired low densities.

Other objects and advantages of this invention will be apparent from the following detailed description thereof.

The above objects are obtained by cooling particulate foamable styrene polymer compositions to a temperature of about 0° F. or lower.

The following examples are set forth to illustrate more clearly the principle and practice of this invention to those skilled in the art. All parts are by weight.

EXAMPLE I

Part A

A foamable styrene polymer composition containing 8 weight percent pentane is prepared by an aqueous suspension polymerization process employing as the suspending agent both a polyvinyl alcohol containing 12% unhydrolyzed acetate groups and a sodium salt of bis (sulfonaphthyl) methane. The polymer particles are obtained as clear, transparent beads having an average diameter of ¼ inch. The foamable polymer particles are stored for 7 days at 20° C. before use in the subsequent examples.

Part B

Beads of foamed polystyrene are prepared by heating the foamable styrene polymer particles prepared in part A above for 5 minutes in boiling water. The foamed polystyrene beads have a density of about 11 lbs. per cubic foot and large irregular cell sizes.

EXAMPLE II

Part A

The foamable styrene polymer particles prepared in Example I, part A, are stored at 0° F. for 24 hours in an insulated cabinet.

Part B

Foamed styrene polymer particles are prepared by heating the treated styrene polymer beads of part A above for 5 minutes in boiling water. The foamed styrene polymer particles have a density of about 8 lbs. per cubic foot and a uniform small cell size in which the average cell diameter is less than 0.02 inch. These results are to be compared with Example I, part B, wherein the non-treated styrene polymer particles yielded foamed particles of irregular cell size and having a density of 11 lbs. per cubic foot.

EXAMPLE III

In another test the foamable styrene polymer particles prepared in Example I, part A, are stored for 18 hours in a Dry Ice chest. After this treatment, the polymer particles are foamed by heating for 5 minutes in boiling water to obtain foamed styrene polymer particles of a uniform small cell size which have a density of about 6 lbs. per cubic foot.

The foaming characteristics of particulate foamable styrene polymers are improved by cooling them to a temperature of 0° F. or preferably much lower, e. g., to —40° F. or lower. For optimum results, the polymer particles should be cooled as rapidly as possible. For reasons which are not clearly understood, the cooling of the particulate foamable styrene polymers in some way alters the characteristics of the polymer particles so that foams of smaller and more uniform cell sizes and lower density are obtained when the treated polymer particles are subsequently heated to a foaming temperature. The beneficial effect obtained by the cooling appears to be independent of the storage history of the particulate foamable styrene polymer particles. Essentially comparable foams are obtained whether (1) the polymer beads are cooled immediately after preparation and foamed immediately after the cooling step or (2) stored at room temperature for an extended period, cooled and foamed immediately thereafter or (3) stored at room temperature for an extended period, cooled and again stored at room temperature for an extended period before foaming.

The foamable styrene polymer compositions treated by the method of this invention comprise a styrene polymer and a foaming agent which is a volatile organic compound having a boiling point below the softening point of the styrene polymer employed.

The styrene polymers included in the compositions of this invention are homopolymers of styrene and interpolymers of styrene containing a predominant proportion of styrene, i. e., greater than 50 percent and preferably greater than 75 weight percent styrene. Examples of monomers that may be interpolymerized with the styrene include the conjugated 1,3-dienes, e. g., butadiene, isoprene, etc., alpha,beta-unsaturated monocarboxylic acids and derivatives thereof, e. g., acrylic acid, methyl acrylate, ethyl acrylate, butyl acrylate, 2-ethylhexyl acrylate and the corresponding esters of methacrylic acid, acrylamide, methacrylamide, acrylonitrile, methacrylonitrile, divinyl benzene, etc. If desired, blends of the styrene polymer with other polymers may be employed, e. g., blends of the styrene polymer with rubbery diene polymers or the analogous compositions obtained by dissolving a rubbery diene polymer in styrene monomer and subsequently polymerizing the mixture. In any of the above-type resins, all or a portion of the styrene may be replaced with its closely related homologues such as alpha-methylstyrene, o-, m-, and p-ethylstyrenes, o-, m-, and p-methylstyrenes, 2,4-dimethylstyrene, etc. In general, the styrene polymers employed should have a molecular weight in the range of about 40,000–80,000 (as determined by the Staudinger method).

The foaming agent included in the compositions of the invention may be any organic compound which boils below the softening point of the styrene polymer and which can be incorporated substantially homogeneously therethrough. Preferably, although not mandatorily, the foaming agent should have little or no solvent action on the polymer. Suitable examples of such foaming agents include acetone, methyl alcohol, methyl acetate, ethyl acetate, methyl formate, ethyl formate, dichloroethylene, isopropylchloride, propionaldehyde and dipropyl ether. Other examples of suitable foaming agents include methyl chloride, dichloroethane, dichloro-difluoromethane and other low-boiling chlorofluoroalkanes. An especially preferred class of foaming agents consists of aliphatic hydrocarbons boiling within the range of about 10° C. to about 80° C., e. g., pentane, hexane, heptane, cyclopentane, cyclopentadiene and petroleum ethers boiling within the indicated temperature range. If desired, mixtures of two or more foaming agents may be employed.

The treated particulate foamable styrene polymer compositions of the invention may be used interchangeably with non-treated particulate foamable styrene polymer compositions to provide styrene polymer foams of lower density and/or finer pore size.

The above descriptions and particularly the examples are set forth by way of illustration only. Many other variations and modifications thereof will be obvious to those skilled in the art and can be made without departing from the spirit and scope of the invention herein described.

What is claimed is:

1. A method for improving the foaming characteristics of particulate styrene polymers having incorporated therein a volatile organic compound as a foaming agent which comprises cooling said styrene polymer particles to a temperature not higher than about 0° F., said volatile organic compound having a boiling point below the softening point of the styrene polymer.

2. The method of claim 1 wherein the styrene polymer particles are cooled to a temperature not higher than —40° F.

3. A method for improving the foaming characteristics of particulate styrene polymers having incorporated therein, as a foaming agent, an aliphatic hydrocarbon boiling in the range of 10–80° C. which comprises cooling said styrene polymer particles to a temperature not higher than about 0° F.

4. The method of claim 3 wherein the styrene polymer particles are cooled to a temperature not higher than —40° F.

No references cited.